No. 712,877. Patented Nov. 4, 1902.
P. WHITING.
AIR BRAKE SYSTEM.
(Application filed Oct. 9, 1901.)
(No Model.) 6 Sheets—Sheet 3.

Fig. 3.

Witnesses:
F. L. Durand
Frank G. Radelfinger

Inventor
Paul Whiting,
By Louis Bagger & Co.,
Attorneys

No. 712,877. Patented Nov. 4, 1902.
P. WHITING.
AIR BRAKE SYSTEM.
(Application filed Oct. 9, 1901.)

(No Model.) 6 Sheets—Sheet 4.

Witnesses:
F. L. Ourand
Frank G. Radelfinger

Inventor:
Paul Whiting,
By Sans Bagger Co.
Attorneys

No. 712,877. Patented Nov. 4, 1902.
P. WHITING.
AIR BRAKE SYSTEM.
(Application filed Oct. 9, 1901.)
(No Model.)
6 Sheets—Sheet 5.

Witnesses:
F. S. Ourand
Frank G. Radelfinger.

Inventor:
Paul Whiting,
By Lewis Bagger & Co.
Attorneys

No. 712,877. Patented Nov. 4, 1902.
P. WHITING.
AIR BRAKE SYSTEM.
(Application filed Oct. 9, 1901.)
(No Model.) 6 Sheets—Sheet 6.

Witnesses:
F. L. Ourand
Frank G. Radelfinger.

Inventor:
Paul Whiting,
By Suns Buyyei & Co,
Attorneys

UNITED STATES PATENT OFFICE.

PAUL WHITING, OF EAST LAS VEGAS, TERRITORY OF NEW MEXICO.

AIR-BRAKE SYSTEM.

SPECIFICATION forming part of Letters Patent No. 712,877, dated November 4, 1902.

Application filed October 9, 1901. Serial No. 78,145. (No model.)

*To all whom it may concern:*

Be it known that I, PAUL WHITING, a citizen of the United States, residing at East Las Vegas, in the county of San Miguel and Territory of New Mexico, have invented new and useful Improvements in Air-Brake Systems; of which the following is a specification.

My invention relates to air-brake systems; and the object of the same is to produce a system which will be provided with means for meeting all emergencies and will be simple in construction and efficient in application.

My system comprises an auxiliary or automatic air-line, which will be termed the "train-line," and an independent release and application line, which will be termed the "straight-air" line. These two lines are connected to a quadruple valve and an engineer's equalizer-valve, both of which form the subject-matter of independent applications for patents, filed November 12, 1901, Serial Nos. 78,146 and 77,970, respectively. Besides the two valves above mentioned a main reservoir, brake-cylinder, hose-couplings, a safety-valve, a whistle-valve, and two gages are also connected to the train-line.

The novel parts of my construction and arrangement are fully described in this specification and claimed, and illustrated in the accompanying drawings, forming a part thereof, in which—

Fig. 10 is a vertical longitudinal section of my quadruple valve D and a portion of the auxiliary reservoir E. Fig. 10$^a$ is a detail of the triangular port.

Like characters of reference designate like parts in the different views of the drawings.

In the following description of the apparatus comprised in my system the equalizer and cylinder valves will be first described, then the quadruple valve, after which the minor parts will be described and the connections of all members to the two main lines will be pointed out. The operation of each unit will be set forth at length in connection with its description to facilitate the understanding of the operation of the whole.

The numeral 1 designates the casing of my large cylinder-valve A, which consists of two sections, an upper and a lower, (designated 1$^a$ and 1$^b$, respectively.) Snugly fitting the casing 1 and mounted to turn therein on a stub-shaft 2 is a hollow cylinder 3. The shaft 2 has an end triangular in cross-section, and fitted thereon is a handle 4 for use in turning the cylinder 3. The triangle is irregular to prevent putting the handle on wrong. The handle 4 is provided with a spring-catch 5, adapted to engage a series of five lugs formed on the upper half 1$^a$ of the casing, which lugs are designated by the numerals 6 to 10, both inclusive. The extreme lugs 6 and 10 are undercut at 6$^a$ and 10$^a$, respectively, to engage and stop the catch, while the intermediate lugs 7, 8, and 9 are beveled off on the sides to enable the catch 5 to be forced to ride over them. The lower half 1$^b$ of the casing is provided with five ports, (designated by the numerals 11 to 15.) The port 11 is connected by a passage 16 to a pipe 17, connected to the main reservoir on the locomotive. The passage 16 also communicates with a pipe 16$^a$, connected to a governor. (Not shown.) The port 12 is connected to the rear chamber of the lower cylinder of the equalizer-valve B by a passage 18. The port 13 is connected by a passage 19 to the upper chamber of the upper cylinder of the equalizing-valve B. The port 14 is connected by a passage 20 to the forward chamber of the lower cylinder of the equalizing-valve. This passage also connects with a pipe 20$^a$, connected to a gage. The port 15 is the exhaust and communicates directly with the open air. The cylinder 3 has a series of ports therein corresponding with the ports in the casing 1$^b$. The cylinder-ports are seven in number. Two of the cylinder-ports 11' and 11² are located to be brought into register with the port 11 by using the handle 4, one other 12' is located to be brought into register with the port 12 in the casing, two ports 13' and 13² are located to be brought into register with the port 13, two ports 14 and 14² are located to be brought into register with the port 14, and the two remaining ports 15' and 15² are located to be brought into register with the port 15 in the casing.

Figure 2:
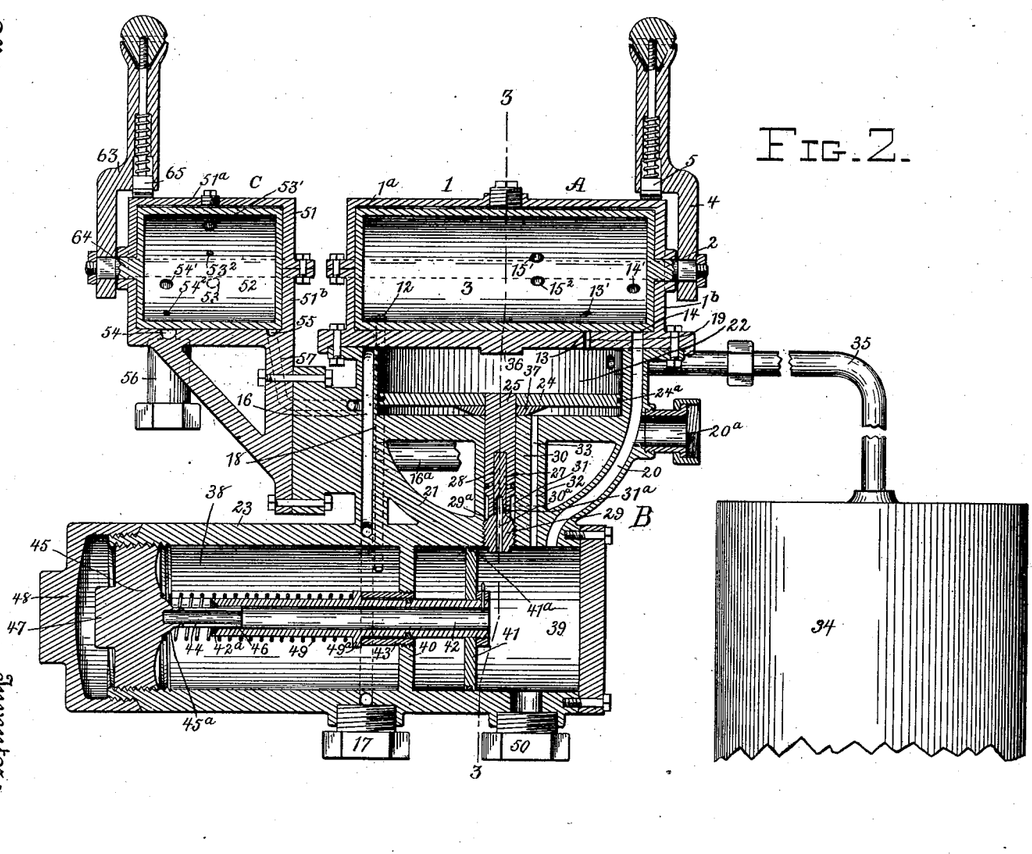
Fig. 2 is a vertical longitudinal section of my cylinder and equalizer valves.
Figure 3:
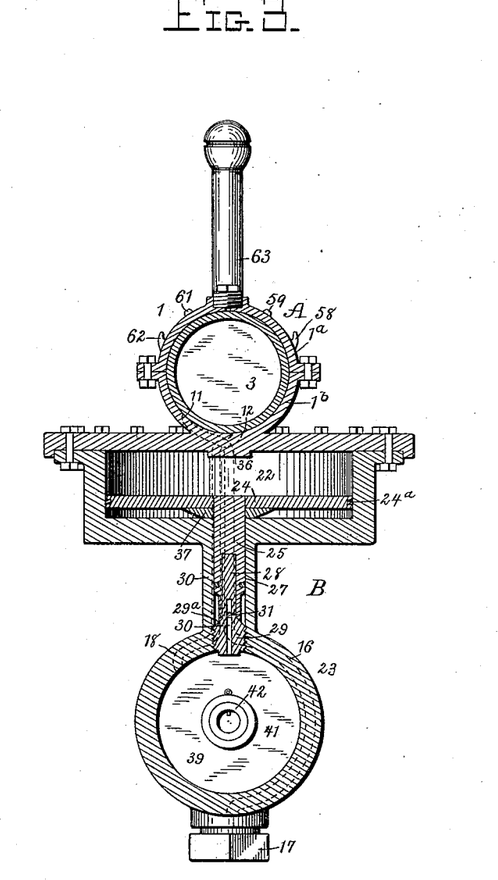
Fig. 3 is a section on the line 3 3, Fig. 2.
Figure 4:
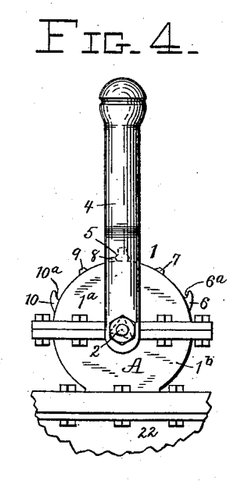
Fig. 4 is an end view of the large cylinder-valve.
Figure 5:
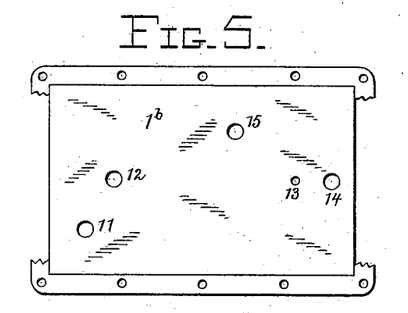
Fig. 5 is a development of the lower half of the casing of the same.
Figure 6:
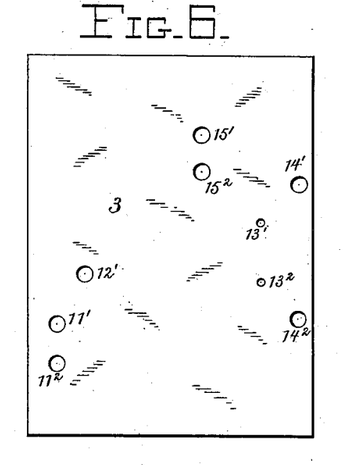
Fig. 6 is a development of the cylinder of the same.
Figure 7:
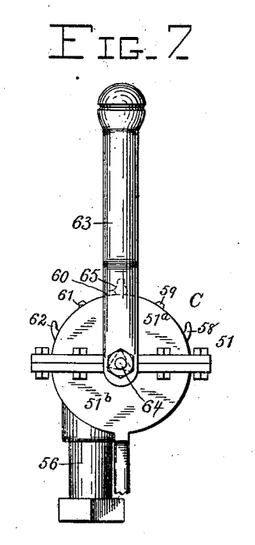
Fig. 7 is an end view of the small cylinder-valve.
Figure 8:
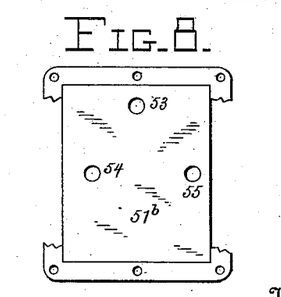
Fig. 8 is a development of the lower half of the casing of the same.
Figure 9:
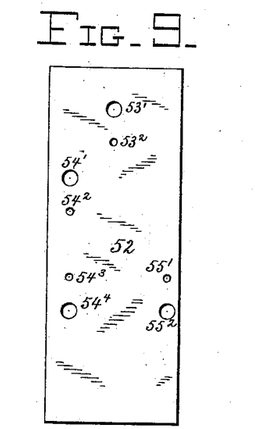
Fig. 9 is a development of the cylinder of the same.

The equalizing-valve B consists of two main parts, an upper cylinder 22 and a lower cylinder 23, which cylinders are connected by ribs 21. The cylinder 22 is bolted to the valve A and communicates therewith, as before mentioned, by way of a passage 19. Mounted within the cylinder 22 is a tightly-fitting piston 24, having packing-rings 24ᵃ and a stem 25. The stem 25 fits snugly a casing 30, formed integral with the lower head of the cylinder 22. The lower end of the stem is bored longitudinally at 27 for a portion of its length, and fitting within the bore is a shank 28, formed integral with a threaded head 29, screwed in the lower end of the casing 30. The head 29 is slotted at 30ᵃ to provide a passage for the air and beveled off on its upper side at 29ᵃ. The stem 25 is beveled oppositely from the head 29 and abuts the same, thereby forming a tight joint and normally closing the slot 30ᵃ to the passage of air. The stem 25 is cut away at 31, adjacent to the head, and apertured transversely at 31ᵃ to enable the air to pass, when the piston 24 is raised, through the slot 30ᵃ and into a passage 32, communicating with the open air. This is the train-line exhaust, as will appear. The cylinders 22 and 23 communicate by means of a passage 33, formed in the casing and connecting the lower chamber of the upper cylinder with the forward chamber of the lower one. A reservoir 34 is connected to the cylinder 22 at a point above the piston 24 by a pipe 35. This tank increases the capacity of the cylinder and holds a reserve supply of air, which increases the efficiency of the valve. A bumper 36, formed in the top of the cylinder 22, limits the movement of the piston, and keeps it from covering the pipe 35. A second bumper 37 on the piston 24 limits the downward movement thereof and keeps it from closing the passage 33.

The lower cylinder 23 is divided into two chambers 38 and 39 by a transverse partition 40, which chambers will be termed the "rear" and "forward" ones, respectively. Mounted within the cylinder is a piston 41, having a packing-ring 41ᵃ and a hollow stem 42 snugly fitting a sleeve 43, fitted within a central aperture in the partition 40. The stem 42 is beveled off at 42ᵃ and fits snugly over a hollow shank 44 and abuts the beveled inner face 45ᵃ of the rear head 45 of the cylinder. This shank 44 is integral with the head 45 and is slotted at 46 to permit the passage of air when the stem 42 is unseated from the head. The head 45 is threaded and is adjustably fitted in the end of the cylinder 23. A squared portion 47 accommodates a wrench, and a cap 48, fitted over the end of the cylinder, makes it doubly tight. To provide means for regulating the pressure necessary to displace the piston 41 from its normal forward position, a stiff spiral spring 49 is mounted on the stem 42 and bears on the head 45 at one end and oppositely on a collar 49ᵃ, integral with the stem. The tension of the spring can be adjusted by means of the adjustable head 45. The collar 49ᵃ also limits the travel of the piston. As before mentioned, the cylinder-valve A and the rear compartment 38 of the cylinder 23 are connected at port 12 by the passage 18 and the forward compartment 39 is connected to the valve A at port 14 by the passage 20. The compartment 39 is also connected to the main train-line by a pipe 50. The pipe 17, before mentioned, which communicates with the passage 16, is coupled to the bottom of the cylinder 23. The passage 16 traverses the casing of the cylinder, but has no connection with the interior thereof.

The second small cylinder-valve (designated C) is similar in construction to the valve A and is bolted to the connecting-casing just below the valve A. The valve C comprises a casing 51, having upper and lower portions 51ᵃ and 51ᵇ, respectively, and a cylinder 52, fitted therein. The lower half 51ᵇ of the casing is provided with three ports, an exhaust-port 53 and two other ports 54 and 55. The pipe 56 communicates with the port 54 and is connected to the train-line, which supplies straight air to the brake-cylinders. The port 55 communicates with a passage 57, which in turn communicates with the passage 16, connected to a pipe 17, connected to the main reservoir. The cylinder 52 is pierced by eight ports, four large and four small ones. Four of the ports, two large and two small, are designed to register with the port 54 and are designated by the characters 54', 54², 54³, and 54⁴. Two of the remaining four ports, a large and a small one, are designed to register with the exhaust-port 53 and are designated 53' and 53², while the other ports, a large and a small one, are located to register with the port 55 and are denoted by the characters 55' and 55². The upper half 51ᵃ of the casing has five lugs formed thereon, which are numbered from 58 to 62, inclusive. The two extreme lugs 58 and 62 are undercut. A handle 63 is connected to a stub-shaft 64 in the cylinder and provided with a spring-actuated catch 65, which is adapted to ride over the lugs 59, 60, and 61 and to engage the lugs 58 and 62.

The operation of my three valves A, B, and C will now be set forth and the course of the air traced with the handles on the cylinder-valves in their different positions. With the handle 4 pushed over to its extreme position, with the catch 5 engaging the undercut lug 6, the valve A is in the first position. This gives the emergency action of the brakes.

Ports 14 14' and the exhaust-ports 15 15' now register. The air can then flow from train-line through pipe 50 into compartment 39 of cylinder 23, through passage 20, and ports 14 14' to cylinder 2, and then through ports 15 15' to open air. With the catch 5 abutting the lug 7 the valve A is in the second position. The ports 13 13' and exhaust-ports 15 15² now register, and air in the cylinder 22 above the piston and in the reservoir 34 flows through passage 19, ports 13 13', and ports 15 15² to open air until the pressure in the train-line acting on the piston 24 through pipe 50, chamber 39, and passage 33 raises the piston 24. All the air might be released, if desired. This action permits the air from train-line to enter the slots 30, then around the cut-away portion 31 of the stem 25, and escape to the open air through passage 32, giving an exhaust and setting brakes. When the pressure in the train-line becomes reduced to that of the air remaining in the reservoir 34, the piston 34 will be again seated and the escape of air shut off. When the handle 4 stands on the center, as shown in the drawings, with the catch 5 abutting lug 8, we have the third position. The ports in the cylinder 3 are all lapped. When the handle is moved over the lug 8 toward 9, the three pairs of ports 11 11', 12 12', and 13 13² begin to coincide, and when the catch 5 abuts the lug 9 we have the fourth position and these ports all register. Air can now pass from the main reservoir through the pipe 17, connected to the bottom of valve 23, through the passage 16, and into the cylinder-valve by way of ports 11 11', and out by way of ports 12 12', down through passage 18 into the rear compartment 38 of the cylinder 23, also down through ports 13 13² and passage 19 to cylinder 22. Since the stem 42 is normally unseated from the head 45, the air will pass from chamber 38 through slots 46, through the hollow stem 42 into chamber 39, then into the train-line through the pipe 50, releasing the brakes, and also into the cylinder 22 by way of the passage 33. The admission of air beneath the piston 24 will not raise it, since air at the same pressure is also admitted above the piston by means of ports 13 13' and passage 19, from whence it passes into the reservoir 34 by way of pipe 35. This is the running position of the system. With the apparatus in the condition described above as soon as the pressure of air in the train-line reaches a predetermined intensity equal to the adjusted tension of the spring 49 the piston 41 will seat the stem 42, thereby shutting off the access of the air to chamber 39 and the train-line; but if from leakage the pressure in the train-line should be diminished the stem 42 would be again unseated and the supply renewed. Therefore when the valve A is in this position with the catch abutting lug 9 the valve B automatically equalizes the train-line and main-reservoir pressure—that is, it restores the pressure in the train-line to its normal, which is equal to the adjusted expansive force of the spring 49. When the handle is moved over with the catch 5 engaging lug 10, this is the fifth position, and the pairs of ports 11 11² and 14 14² now register. This position gives a quick recharge and full release, as the air passes from main reservoir through pipe 17, passage 16, ports 11 11² to cylinder, and out through ports 14 14², passage 20, through chamber 39, and pipe 50 to train-line. This completes the positions of the valve A, and those of the valve C will now be taken up.

The first position of the valve C is obtained when the handle 63 is moved over with the catch 65 engaging the lug 58. In this position the exhaust-ports 53 53' and the ports 54 54' register. This gives a rapid exhaust from the brake-cylinders by way of the straight air-line, the pipe 56, and the ports 54 54' and 53 53'. This is the full-release position. The second position results from setting the handle 63 at the lugs 59. The ports 53 53² and 54 54² then register and give a less rapid exhaust in the same manner as before. The third position results from setting the handle 63 on the center adjacent to lug 60. All ports are then lapped. The fourth position is given by setting the handle 63 adjacent to the lug 61. This registers the ports 54 54³ and 55 55' and admits a small supply of air to the brake-cylinder, which supply passes into them from the main reservoir by way of pipe 17, passage 16, passage 57, ports 55 55', through cylinder to ports 54 54³, and pipe 56. This is an emergency position. The fifth position results from moving the handle 63 until the catch 65 engages the lug 62. This registers the ports 54 54⁴ and 55 55² and gives a large supply to the brake-cylinders, which passes into them by way of pipe 17, passage 16, passage 57, ports 55 55², ports 54 54⁴, and pipe 56. This is the second emergency position.

Figures 10, 10A:
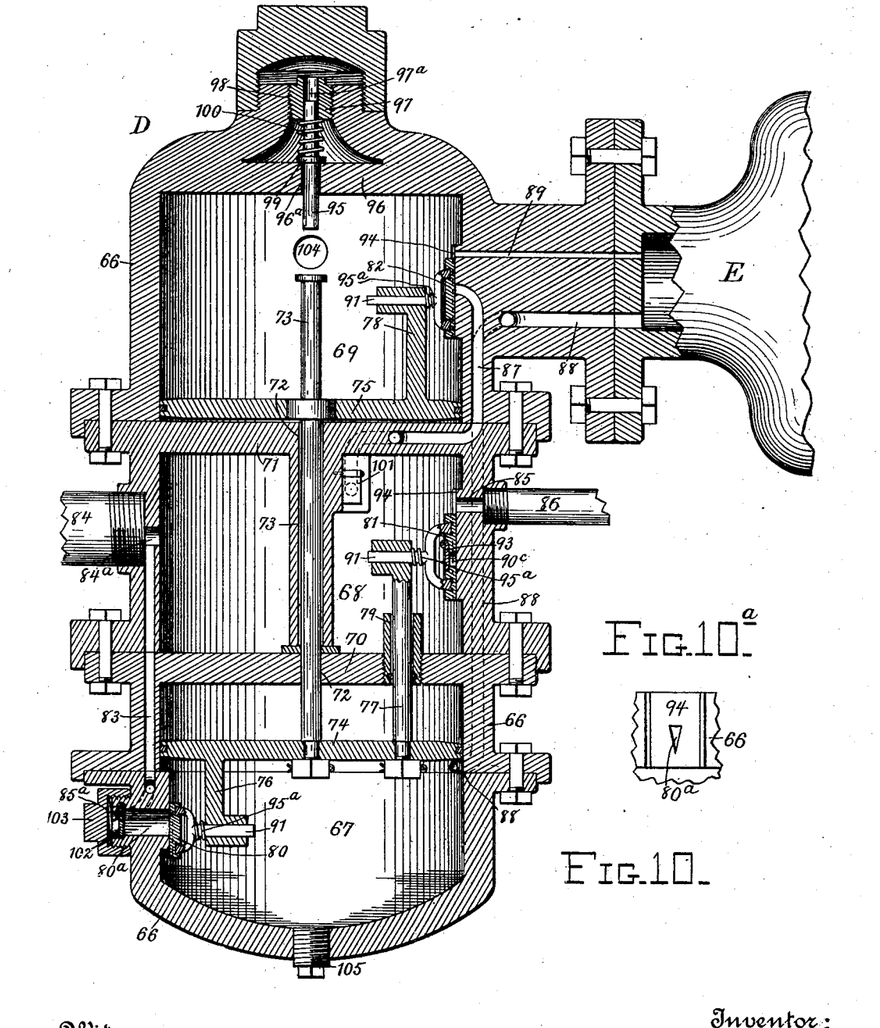

The letter D designates my quadruple valve, which valve has a casing 66 formed in three sections bolted together and divided into three compartments 67, 68, and 69 by two transverse partitions or cross-heads 70 71. Mounted to slide in central apertures 72 in the partitions 70 71 is a piston-rod 73, bearing two pistons 74 and 75, keyed thereon. The piston 74 is located in compartment 67, while the piston 75 is located in compartment 69. These pistons are each supplied with packing-rings. The piston 74 bears two arms 76 and 77, and the piston 75 bears one arm 78, formed integral therewith. The arm 76 is integral with the piston 74; but the arm 77 is rigidly mounted in an aperture therein and snugly fits a sleeve 79, mounted in the partition 70. Each of the arms 76, 77, and 78 carries a slide-valve, which valves are designated by the numerals 80, 81, and 82, respectively. The valve 80 is located in compartment 67 and is designed to close the mouth of a passage 83, traversing the casing 66 and communicating with a pipe 84, connecting the valve D and the brake-cylinder. The port 80ª, closed by the valve 80, is triangular for a purpose which will appear. The pipe 84 is also connected by a passage 84ª to the compartment 68. The valve 81 is located in compartment 68 and is designed to close the mouth of an exhaust-passage 85, communicating with a pipe 86, connected to the straight-air line in case two lines are used; otherwise it opens to the air. The valve 82 is located in the compartment 69 and is designed to close the mouth of two passages, the first, a passage 87, which communicates with the compartment 68, and the second, a smaller passage 89, which establishes direct communication between the compartment 69 and auxiliary reservoir E. The auxiliary reservoir E and the chamber 67 are connected directly by a tortuous passage 88, traversing the casing 66 of the valve.

Figure 11:
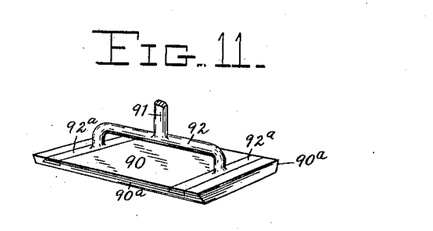
Fig. 11 is a detail of one of the slide-valves.

The valves 80, 81, and 82 are very similar in construction and comprise a slide 90, (see details,) beveled off on the sides at 90ª, and a stem 91, formed integral with a yoke 92, having dovetailed feet 92ª, fitting transverse dovetail grooves in the slide 90. In case of the valve 81 its slide 90 is apertured at 90ᶜ and a gate or flap valve 93 is mounted to close the opening and to swing inwardly. Each of the slides 90 fits grooved seats 94, integral with the casing 66. Springs 95ª surrounds the stems 91 and bear on the arms 76, 77, and 78, in which the stems 91 are mounted to slide, and thereby serve to hold the slides 90 in their seats 94.

Mounted in the top of the casing 66 in line with the piston-rod 73 is a stem 95. This stem 95 fits an aperture 96ª in a cross-bar 96 and an aperture 97ª in a nut 97, fitted in a threaded aperture 98 in the casing 66. A collar 99 limits the movement of the stem and a spring 100 surrounds it and bears against the collar 99 and the nut 97. This stem 95 is similar to the spring-buffer stem used in the triple and is for an analogous purpose.

Figure 12:
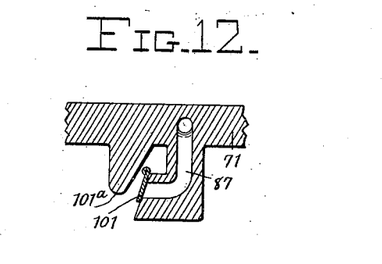
Fig. 12 is a detail of the flap-valve 10.

As before mentioned, the passage 87 communicates with the compartment 68. The end of the passage 87 is not open, but is closed by a flap or gate valve 101, set to be normally held closed by gravity and having an overhanging lug 101ª adjacent thereto (see Fig. 12) to limit its backward swing. The valve 101 comes into use to prevent the return of air from the brake-cylinder when an emergency application is made. The passage 83 does not open directly to valve 80, but has an enlarged mouth 85ª, within which is located a flap-valve 102, which opens outwardly and also serves to prevent the rebound of air from the brake-cylinder when an emergency application is made. A cap 103 gives access to the valve 102.

Figure 13:
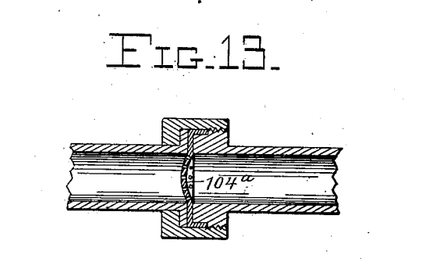
Fig. 13 is a detail of the strainer.

Connection with an automatic air train-line is made by means of a pipe 104, which is connected to the compartment 69 of the valve D. This pipe is supplied with a strainer 104ª. (Shown in detail in Fig. 13 of the drawings.) A plug 105 is fitted in the bottom of the casing 66; but this plug may be replaced by a petcock for draining the valve of accumulated moisture.

Figure 1:
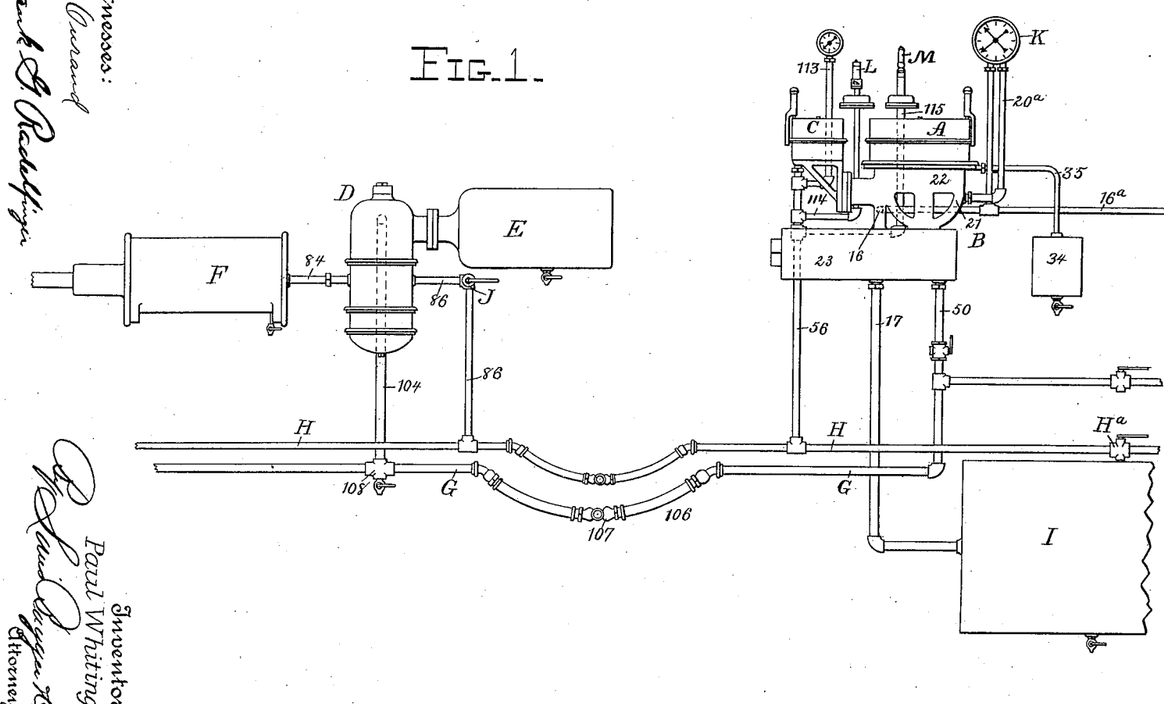
Figure 1 is a diagrammatic view of my system, showing the various units and their connections.

The operation of my valve will now be sketched and the path of the air for different operations traced. As shown in Fig. 1, the brakes are released, and the pressure in the train-line, which is connected to compartment 69 by pipe 104, is equal to the pressure in the auxiliary reservoir E, since they are in direct communication by way of passage 89. Air is free to flow from auxiliary reservoir E through passage 88 into compartment 67, so pressure is equal in compartments 67 and 69. When it is desired to set the brakes, a reduction of pressure is made in the train-line connected to compartment 69 by pipe 104. This will make a reduction of the pressure in compartment 69 and cause the pressure in the chamber 67, which is backed up by the pressure in the auxiliary reservoir E, to raise the piston 74 and operate the valves 80, 81, and 82. The valve 82 will immediately cover the passage 89 and prevent the flow of the air in reservoir E into 69, and the valve 81 will close the exhaust 85. The port 80ª, which is normally closed by the valve 80, will now be gradually opened, the small apex (see detail, Fig. 10ª) being uncovered first. This will permit the air to flow gradually from the auxiliary reservoir E through the passage 88 into the compartment 67, through port 80ª, passage 83, and into the brake-cylinder, setting brakes. As soon as the pressure in the auxiliary reservoir E and chamber 67 is reduced to that of the train-line and chamber 69 the piston 74 will drop, closing port 80ª. The gradual reduction of air in the train-line, as set forth above, constitutes the first application. It should be noted that when port 80ª is entirely closed by the valve 80 the exhaust-port is still closed by the valve 81, which retains the pressure in the brake-cylinder. This action renders the valve D a perfect equalizer, since pressure in the train-line and the auxiliary reservoir E are always kept equal by the above-described operation. The gradual application of the brakes, which results from having the triangular port 80ª, is very important, as it prevents the pulling out of the draw-heads by allowing time for taking up the slack in the train. To set the brakes with greater force, the same action is again repeated. When a release is desired, what I term the "second" application is employed, and the pressure is turned into the train-line. This pressure will be communicated to the chamber 69 by pipe 104 and will force the piston 75 down, operating valves 80, 81, and 82 and opening exhaust-port and chamber 68 to the atmosphere, releasing brake-cylinder pressure, which flows out through pipe 84 into chamber 68 to atmosphere when pipe 86 is omitted and through pipe 86 and line H to atmosphere when said pipe is attached.

Normally the brakes are applied as above, and the stem 95 will serve as a bumper to limit the travel of the piston-rod 93; but when an emergency application is required what I term the "third" application is used and a large reduction of pressure is made in the train-line and chamber 69 large enough to enable the force of contact of the piston-rod 73 with the stem 95 to overcome the tension of the spring 100 and permit the valve 82 to uncover the passage 87. This action will cause air to flow more directly from the chamber 69 to the brake-cylinder by way of passage 87, raising flap 101, chamber 68, and pipe 84. The rapid rush of air into the brake-cylinder will cause more air to enter than would remain if free to return, but this return is prevented by flap-valves 101 and 102.

By means of the straight-air line connected to the pipe 86 a fourth application of air is possible. This is accomplished by turning air into the straight-air line which will flow through pipe 86, raise flap 93, and enter the chamber 68, from whence it passes into the brake-cylinder via pipe 84.

A brake-cylinder F is connected to each of the quadruple valves D of my system and there is one valve for each car. The brake-cylinder is connected to the pipe 84, which is in communication with the center compartment 68 of the quadruple D.

The automatic or main train-line is designated by the letter G and extends from the equalizing-valve B, to which it is connected by the pipe 50, the whole length of the train. The intervals between the cars are spanned by hose-pipes 106, connected by couplings 107 of any known or approved form, such as are covered by my allowed application, filed September 12, 1900, Serial No. 29,799. The train-line G is connected to the quadruple D by the pipe 104, which communicates directly with the upper compartment 69 of the quadruple. A valve 108 is also located in the line for use in emergencies.

Figure 14:
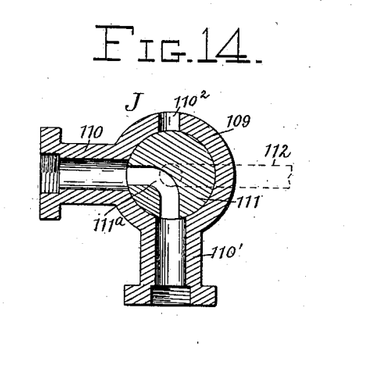
Fig. 14 is a detail of the two-way cock.

The independent release and application line, called the "straight-air" line, is designated by H. This line extends from a main reservoir I throughout the length of the train and is connected to the small cylinder-valve C and the quadruple D by the pipes 56 and 86, respectively, previously described. A valve $H^a$ in the line H adjacent to the reservoir is normally closed. There is an elbow in the pipe 86, and located therein is a two-way cock J. (Illustrated in Fig. 14.) The cock J comprises a casing 109, having two connections 110 and 110' at right angles to each other. Seated in the casing 109 is a ball-valve 111, connected to a stem 112, bent over to form a handle for operating the same. The valve 111 is traversed by an L-shaped passage $111^a$, designed to establish communication between the connections 110 and 110' and the connection 110 and an aperture $110^2$ in the casing. The aperture $110^2$ communicates directly with the open air. When it is desired to cut out the straight-air line H, the handle 112 is turned to establish communication between connection 110 and aperture $110^2$, which gives a direct exhaust for the middle compartment 68 of the quadruple to the atmosphere. If, however, it is desired to employ straight air to hold the system in readiness to make the fourth application of the quadruple valve, the valve 111 is always kept in the position shown in the drawings, with the passage $111^a$ registering with the connections 110 and 110'.

The main reservoir I, which is connected directly to the straight-air line H, is indirectly connected to the main train-line G, since it is connected to the pipe 17, which is connected to the casing 23 of the equalizing-valve and communicates with the cylinder-valve A by way of passage 16, which cylinder is connected to compartment 39 of cylinder 23 by passage 20, to which compartment pipe 50, which is joined to the train-line G, is also connected. All air passes out of the reservoir I through pipe 17, since the valve $H^a$ is always kept closed except in emergencies.

The pipe $20^a$, which is connected to the casing of the equalizer-valve, is connected to a differential gage K, which is also connected to the pipe $16^a$, communicating with the passage 16. A gage for showing the pressure in the train-line H is connected by a pipe 113 to the pipe 56. A reducing or safety valve L, such as described in my Letters Patent No. 666,171, dated January 15, 1901, is also connected to the pipe 56 by a pipe 114. A whistle-valve M, such as is covered by my allowed application, filed April 10, 1901, Serial No. 55,139, is connected to the pipe 56 by a pipe 115. Both the safety and whistle valves are set at a predetermined pressure and permit the escape of air as soon as this point is reached, thereby warning the engineer.

The operation of my system will now be described. For an emergency action of the system the valve A is set in its first position, with the handle adjacent to lug 6 thereon. As before noted, the air now flows out of train-line G through pipe 50, compartment 39, passage 20, ports 14 14', through cylinder 2, and escapes through ports 15 15' to the open air. The above operation brings on the emergency or third action of the quadruple valve, and the piston-rod 73 will contact with the stem 95, displacing it and causing the valve 82 to uncover the passage 87. The air will then flow from chamber 69 to the brake-cylinder F by way of passage 87, (lifting flap 101,) chamber 68, and pipe 84. A moderate action of the brakes is brought about by setting the valve A in the second position, which will cause a slower exhaust from the train-line G by way of slots 30 and passage 32. This brings about the first action of the quadruple valve D, for as soon as the pressure in chamber 69 is reduced the excess of pressure in chamber 67 will raise the pistons 74 and 75 and operate the valves 80, 81, and 82. The port 80ª, normally closed, will now be gradually opened, thus allowing the air from the auxiliary reservoir E to flow through passage 88, compartment 67, passage 83, to brake-cylinder F, setting brakes. To release the brakes, the handle of the valve A is turned over to the fourth position. Air now passes from the main reservoir I through pipe 17, passage 16, ports 11 11', ports 12 12', passage 18, chamber 38, through stem 42 to chamber 39, then through pipe 50 into train-line G. From the train-line G the air flows through pipe 104 into the upper chamber 69 of quadruple valve D, forcing pistons 74 and 75 down. This action opens the exhaust-port 85 in chamber 68 to the atmosphere, releasing brake-cylinder pressure, which flows out through pipe 84 and exhaust 85. When the straight-air line H is connected to port 85 by the pipe 86, the exhaust will be thrown into this straight-air line, and in order that the exhaust shall then be effective to release the brakes valve C must also be set in either its first or second positions. If, however, the valve C is set in third or lap position, there will be no release of brakes, and the auxiliary reservoir will be recharged by the pressure flowing from chamber 69. The train-line may also be pumped up then without releasing the brakes. This is very important, as it enables the engineer to restore the pressure in his auxiliary reservoir and pipe-line after setting brakes. To put on the brakes by straight air, the valve C is set in either its fourth or fifth positions, when air will flow from main reservoir L through pipe 17, passage 16, passage 57, ports in cylinder, pipe 56, train-line H, pipe 86, flap 93, chamber 68, passage 84ª, pipe 84, to brake-cylinder F.

The following are some of the advantages resulting from the use of my system on trains: First, hand-brakes need not be set when descending grades, as the engineer can hold all brakes while pumping up either the auxiliary reservoir or train-line pressure; second, any portion of brake-cylinder pressure can be drawn off without releasing the brakes; third, an exhaust is provided on the engine which enables the rear brakes to be released first and the engine last, thus avoiding breaking in two long trains running at slow speed; fourth, straight air can be turned into the brake-cylinder with the quadruple in any position; fifth, the train-lines are independent, so if either is out of order the other may still be used; sixth, the safety or reducing valve insures safe breaking limit of pressure in brake-cylinders.

Having thus described my invention, what I claim as new, and wish to secure by Letters Patent, is—

1. In an air-brake system, a quadruple valve provided with three compartments, an upper, middle and lower, and means for regulating the admission of air into said compartments, a brake-cylinder connected to said middle compartment, an auxiliary reservoir connected to said upper compartment, a train-line connected to said upper compartment, an equalizing-valve comprising an upper and a lower cylinder and means for regulating the admission of air into said cylinders, said valves being connected to said train-line, and a main reservoir connected to said equalizer-valve, substantially as described.

2. In an air-brake system, the combination of a brake-cylinder, an auxiliary reservoir, a train-line, a main reservoir, an equalizing-valve connected to said train-line and said main reservoir and constructed to regulate the flow of air between them, and a quadruple valve having an upper, a middle, and a lower compartment, said upper compartment being connected to said auxiliary reservoir and said train-line, said middle compartment being in communication with said upper and lower compartments and being connected to said brake-cylinder, said lower compartment being connected to said auxiliary reservoir, said quadruple valve being constructed to regulate the flow of air from said train-line to said brake-cylinder and said auxiliary reservoir, substantially as described.

In testimony whereof I have hereunto set my hand in presence of two subscribing witnesses.

PAUL WHITING.

Witnesses:
M. H. WHITING,
A. J. WHITING.